May 25, 1965         C. W. HANSEN         3,185,843

COLLIMATOR SYSTEM FOR BETA RADIATION THICKNESS GAUGE SENSOR

Filed June 20, 1961         4 Sheets-Sheet 1

INVENTOR.
CARL WOODROW HANSEN
BY
ATTORNEY

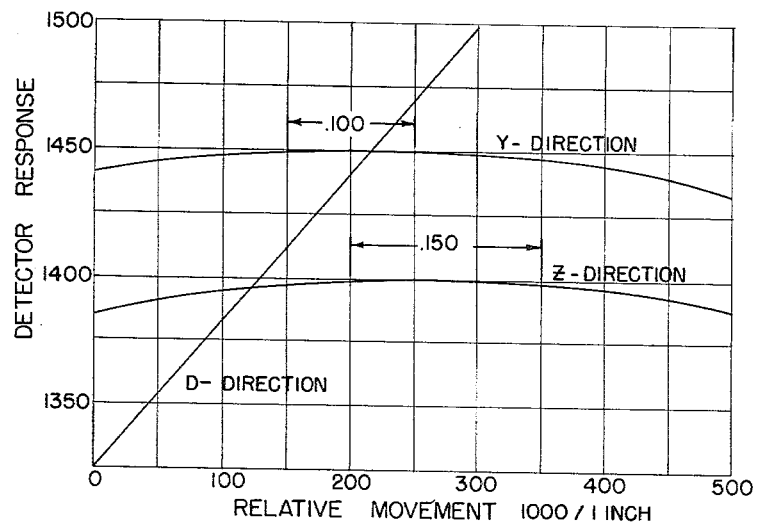
F I G. 2a
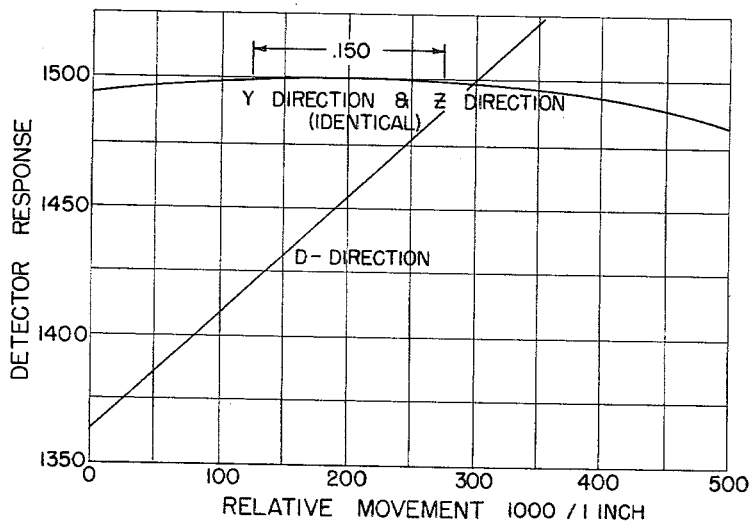
F I G. 2b

_United States Patent Office_

3,185,843
Patented May 25, 1965

3,185,843
COLLIMATOR SYSTEM FOR BETA RADIATION THICKNESS GAUGE SENSOR
Carl Woodrow Hansen, Wayland, Mass., assignor, by mesne assignments, to Laboratory for Electronics, Inc., Boston, Mass., a corporation of Delaware
Filed June 20, 1961, Ser. No. 118,414
7 Claims. (Cl. 250—83.3)

This invention relates in general to radioactive thickness gauges and, more particularly, to a collimator system for a radiation thickness gauge sensor which will render the detector response substantially constant despite minor variations in source detector geometry.

One of the chief commercial applications of radioactive sources is the use of these sources in conjunction with a radiation detector to form a radiation thickness gauge sensor. In general, a radiation thickness gauge utilizes a radioactive source held in fixed relation to a radiation detector, such as an ion chamber, with the detector and source spaced on opposite sides of a sheet of material whose thickness is to be measured. The rate of absorption of the radiation from the radioactive source and, hence, the response of the ion chamber is a function of the thickness of the interposed material. This particular art has been refined to the point where very sensitive measurements of thickness can be made in this way. One of the limitations in accuracy arises from variations in the relative geometry of the ion chamber and the source. These variations in geometry may be due either to thermal expansion of the frame structure holding both the source and the chamber, or to minor misalignment of the chamber and source where the two are mounted on individual carriages for scanning across a wide strip of material to be measured. The problem of position sensitivity is particularly acute in this latter case, in which a frame structure generally referred to as an O frame, which may be several feet wide, is used. Thus, in the most straightforward case where a single source is used and generally located approximately in line with the center of the ion chamber and vertically displaced beneath it, it is obvious that variations in either of two directions in the horizontal plane will result in variation in radiation received by the ion chamber since the solid angle of the radiation flux, intercepted by the ion chamber, is varied. Again, a variation in the vertical direction will have the same effect. One method for reducing this variation, which is described in U.S. Patent 2,883,652, is to use two or more radioactive sources displaced horizontally from one another and with the ion chamber, center line located midway between them. Under these circumstances as the relative position of the source and ion chambers change, the response due to one of the radioactive sources decreases; however, the response due to the other source then increases providing a compensatory effect. While this method somewhat alleviates the problem, nonetheless a peak response is obtained when the ion chamber is exactly on center between the sources and at a preselected vertical displacement, and this response varies when this fixed geometry changes in any of the three possible directions.

Another approach to the same problem employs a collimator between the source and ion chamber such that the beam of radiation is confined and made much smaller in diameter than the responsive surface of the ion chamber. In theory, under these circumstances, variations in lateral position of the source with respect to the ion chamber do not result in any significant change in chamber response until the collimated beam is striking the edge of the chamber. In fact, however, where the radioactive source is a beta-ray emitter, a significant quantity of scattered radiation or secondary radiation is produced from the collimating member. This radiation is diffuse and varies inversely with the square of the distance between the point of origin of the scattered radiation and the chamber. Hence, variations in the vertical displacement between the source-collimator combination and the chamber result in changes of radiation impinging upon the chamber surface and hence in changes in the chamber current response. Since this radiation is diffuse, changes in the lateral position also result in variations in chamber response.

The above described method, while constituting an improvement over a single source and chamber arrangement, results in relatively small allowable motions in a typical instance. For example, with a krypton 85 radioactive source, which emits beta radiation, a variation of position in the vertical plane of about .01 inch would result in a change in reading of a typical detector corresponding to about a .25 milligram per centimeter square change in the weight of the measured material. Under these same circumstances, with a strontium 90 beta emitting source, the apparent change in material due to a variation of .01 inch in position corresponds to a 2.0 milligram per centimeter square change.

It is, therefore, a primary object of the present invention to provide a radioactive thickness gauge sensor having a collimator arrangement wherein the detector response remains substantially constant despite minor variations in the relative position of source and detector.

It is another object of the present invention to provide a rugged, economic collimation system for beta thickness gauges which will maintain the chamber response substantially independent of minor variations in geometrical position of the detector and radioactive source materials.

It is still another object of the present invention to provide a collimation system particularly adapted for use in beta ray thickness gauges wherein the detector response is substantially independent of minor variations in the source position and in which the collimation system is applicable to either single or multiple radioactive sources.

Broadly speaking, the thickness gauge of the present invention utilizes a collimation system in which a single hole collimator is placed in closed juxtaposition to each of the radioactive sources and the sensitive face of the detector is provided with an absorber plate arranged to intercept a portion of the collimated beam from each of the sources. There is substantially no variation in response with movement of the sources laterally with respect to the center line of the detector, since the absorbing plate intercepts more of one collimated beam while intercepting less of the other collimated beam. The detector response remains substantially independent of the vertical displacement between the radioactive source and itself since moving the source closer to the detector, while it increases the contribution from scattered radiation also introduces the compensating effect of the absorbing plate intercepting a larger portion of the solid angle of direct radiation hence maintaining the total received radiation at the detector at a substantially constant level. The exact operation of this collimation system, both with a single radioactive source and with multiple sources, will be explained in more detail below.

Other objects and advantages will become apparent from the following detailed description when taken in conjunction with the accompanying drawing in which:

FIGS. 2a and 2b are graphical representations of ion chamber current as a function of separation between chamber and source for a Sr–90 and Kr–85 source, respectively, without the collimation system of this invention;

Figure 1:
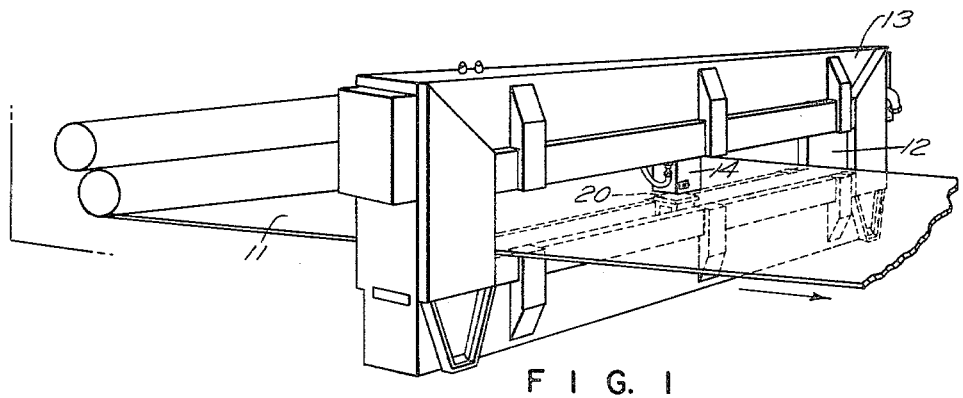
FIG. 1 is a perspective view of a radiation thickness gauge mounted on a material sheet.

With reference now specifically to FIG. 1, a radiation thickness gauge operating on a strip of material 11 is shown. The material to be measured 11 is fed through the open central section of an O frame 13. The radioactivity detector 14, which typically would be an ionization chamber, is mounted on the upper inside portion of the O frame 13 and is generally adapted to scan along the length of this frame. The radioactive source housing 20 is mounted on the lower inside portion of the opening of the O frame opposite the detector 14 beneath the material 11 to be measured. The source housing 20 is also adapted to be moved longitudinally along the lower inside portion of the O frame opening in conjunction with the motion of the detector 14. The source and detector are scanned back and forth across the material strip to provide a continuous output measurement of the thickness of material 11. While the geometric relation of the detector and source should be maintained constant, it is the slight variations in the constancy of this geometric relation with which the present invention is concerned.

Referring now to FIG. 2, the ion chamber response as a function of separation from the source is shown. FIG. 2a represents the response of the ion chamber as a function of separation in the Y and Z horizontal directions and D vertical direction between source housing and the chamber, for the case of an ion chamber and a Sr–90 source without the collimation system. As indicated in FIG. 2a, there is no "plateau" of detector response as a function of vertical displacement. FIG. 2b represents the same functions with a Kr–85 source without the collimation system of this invention. Here, again, there is no "plateau" in the D direction.

Figure 3:
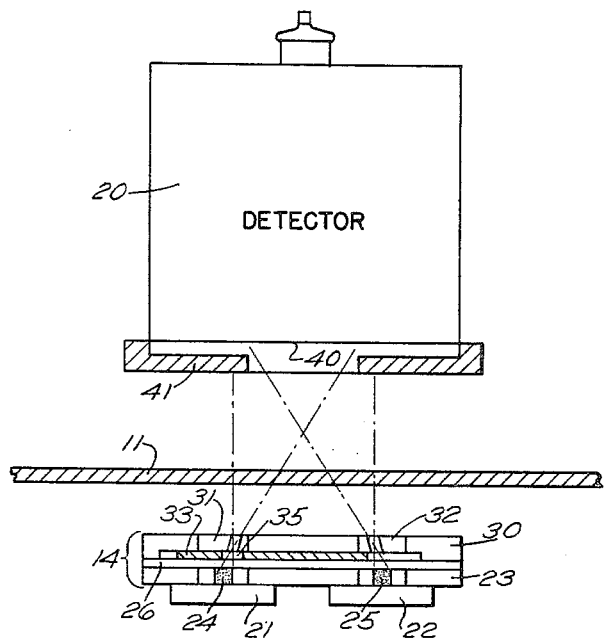
FIG. 3 is a vertical cross-sectional view of a thickness gauge sensor in accordance with the principles of this invention.
Figure 4:
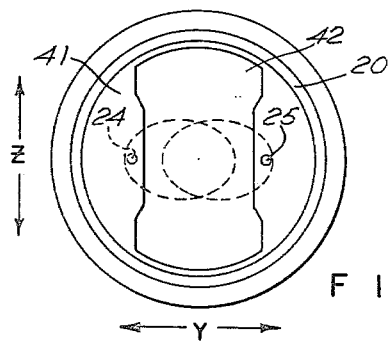
FIG. 4 is a view from above of the apparatus of FIG. 3.

With reference now specifically to FIG. 3 and FIG. 4, a preferred embodiment of this invention is shown in vertical cross-sectional and top view. A radioactive source housing 14 is shown disposed beneath the material to be measured 11 with the detector element 20 mounted above the material to be measured. Turning first to the source housing 14, a pair of substantially identical radioactive source mounts 21 and 22 are shown mounted underneath and protruding into the bottom plate 23 of the radioactive source housing. The radioactive material is concentrated in the center sections 24 and 25 of mounts 21 and 22, respectively. The radioactive material may be any suitable β-ray emitter, Sr–90 and Kr–85 being typical examples. Generally, the radioactive material would be sealed within the source mount in order to prevent leakage and contamination through physical dispersion and migration. For this purpose a relatively thin cover member 26 is sealed to the top of plate 23. This cover member 26 is essentially transparent to the radiations from the radioactivity sources themselves. The upper enclosing member 30 of the radioactive source housing 14 includes the single hole collimators 31 and 32. Each of the holes is inclined inwardly and upwardly such that the collimated beams converge at a point above the material 11 to be measured, but below the lower surface of the detector element 20. Between this upper enclosing member 30 and the thin cover 14 of the lower plate is provided a space such that a shutter member 33 can be operated. The shutter member 33 is formed of a material opaque to the radiations from the radioactive sources. The shutter member has two positions, open and closed, and in the open position (as shown) an opening 35 is aligned between the radioactive material 24 and the collimator 31 in order to pass radiation and, in this position, the shutter member does not extend sufficiently to intercept radiations from source 25 impinging upon collimator 32. In the closed position the shutter 33 is moved to the right such that opening 35 is no longer aligned and such that the shutter intercepts radiation from source 25.

The detector element 20 may be any radiation detector such as a geiger tube, or scintillation detector, but would typically be formed of an ionization chamber having a radiation transparent lower window surface 40. Fitted across the bottom surface of the detector 20 is a masking plate 41 which, together with the single hole collimators 31 and 32, forms the collimation system. As is perhaps best seen from FIG. 4, the absorber plate 41 provides a generally rectangular open section 42 in the middle and this opening is widened slightly at either end near the periphery of the ion chamber. The long dimension of this generally rectangular opening is transverse of the line of sight between the two single hole collimators and the size of the opening is such that the collimator holes lie underneath the masking section of the plate. Thus, as indicated by the dotted lines in FIG. 3, the edges of the masking plate 41 intercept a portion of the collimated beams and, therefore, this plate 41, together with the collimators 31 and 32, serves to define the shape of the radiation beams impinging upon the detector surface.

Turning now to the operation of the above described system, it should be understood that at any given separation between the upper surface of the cover 30, of the source housing 14, and the bottom of the masking plate 41, there are two components of each of the radiation beams contributing to the detector current. One component is the direct beta radiation which passes through the collimators 31 and 32 and which, as further defined by the opening in the masking plate 41, impinges upon the lower surface 40 of detector 20. The other component is radiation which is either generated secondary radiation or scattered radiation originating at the single hole collimators 31 and 32. This secondary radiation will be generally isotropic and will, therefore, have an intensity inversely proportional to the square of the distance from the originating point. Thus, the amount which impinges upon the surface of detector 20 will vary inversely with the variation in distance between the upper surface of the single hole collimators 31 and 32, and the lower window 40 of the detector 20. If, then, the vertical distance between the collimators 31 and 32 and the window 40 is decreased, this second component of the radiation will provide an increased ion current due to this effect. However, decreasing this distance will increase the solid angle of the source primary beam which is subtended by the solid section of the masking plate 41 and, thus, the area of irradiation will also be decreased, with the result that the ion current due to the primary radiation will be reduced. The overall effect, then, is a strong tendency to maintain the ion current substantially constant despite variations in this distance. As above described, the single hole collimators 31 and 32 are arranged with respect to the opening of the absorber plate 41 such that the center line of the detector and absorber plate lies centered between the collimators 31 and 32. A substantial portion of the direct radiation beam is intercepted by the solid portion of the absorber plate 41. If now the source housing 14 is displaced in either direction along the line of sight between the single hole collimators 31 and 32, that is the Y axis, by a distance less than the distance between the outer edge of each of the radiation beams and the center opening of the absorber plate 41, the ionization current due to these primary beams will not be varied. Again, if the source is moved in a direction transverse to this line of sight, indicated in FIG. 4 as the Z axis, then the direct radiation beams will move along the longitudinal dimension of the opening in the plate 41 and no substantial variation in ion current will result until the edge of one of the beams is intercepted by the periphery of the ion chamber. The widening at either end of this opening in the masking plate 41 serves to compensate for the decreased efficiency of the ion chamber near the outer walls. It should be noted that, while in the discussion above, the radiation detector has been cited as an ion chamber, that the collimator principles will apply equally to any type of radiation detector, such as a Geiger Mueller tube, scintillation crystal, or silicon detector.

Figure 5:
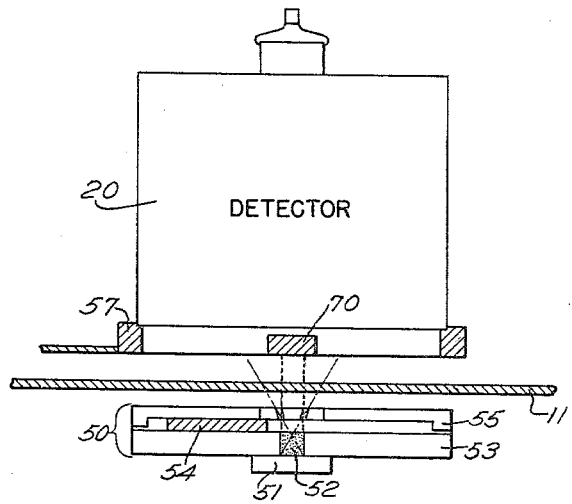
FIG. 5 is a vertical cross-sectional view of a second embodiment of the thickness gauge sensor of this invention.
Figure 6:
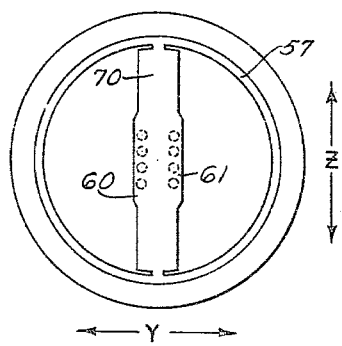
FIG. 6 is a top view of the embodiment of FIG. 5.

With reference now to FIGS. 5 and 6, a second embodiment of this invention is illustrated, in which the radioactive material constitutes a single source which is collimated into two separate beams and thereafter operates in the same manner as was described in the first embodiment. This embodiment is particularly useful where the source material may be gaseous, such as krypton 85, since in this case the requirement of only one sealed gas chamber considerably simplifies the construction.

Turning now to FIG. 5, the radioactive source housing 50 is again formed of a radioactive source mount 51 with the radioactive material confined to a center area 52, and this source mount 51 is mounted in a bottom plate 53 of the source housing 50. A shutter 54 serves to close off the radiations from the radioactive material 52 when in the closed position and when in the open position (as shown) allows these radiations to impinge upon the upper enclosing member 55 which contains the single hole collimators. In this instance the collimation at the source is accomplished by a series of holes lined up in a parallel rectangular array. The collimator holes are lined up with one bank of four holes 60 on the left side of the center of source material 52, with the other bank 61 of four holes being lined up on the right hand side of the center line of source 52, and each bank being equidistant from the center. Each of the holes is slanted upwardly and outwardly from the center line and, hence, the radiation beams emanating from these holes diverge. The detector 20 is again located above the material to be measured 11 with respect to the source housing 50. A masking grill 57 is located on the lower surface of the detector 20 and serves to complete the collimation of the radiation beams. In this embodiment the masking grill is open except for a solid center section 60 which extends across the diameter of the ion chamber. This solid center section is generally rectangular and has its long dimension running parallel with the aligned collimator holes in each of the banks 60 and 61. The solid section is centered with respect to these collimator holes 60 and 61 and is slightly narrowed towards each end near the periphery of the ion chamber. With reference particularly to FIG. 5, it is seen that again the periphery of the beams of radiation impinging upon the detector surface 40 is defined both by the collimator holes in banks 60 and 61 and by the center section 70 of the grill plate 57. In this embodiment again, the radiation impingent upon the ion chamber detector 20 can be considered as having two components; the direct component and the scattered component. The operation of this collimating system to inhibit variation in ion chamber current with variation in the geometric arrangement in any of the three dimensions is the same as that described for the first embodiment above. The narrowing of the solid center section 70 of the masking grill here has the same effect as the widening of the opened center section in the embodiment described above, namely allowing more radiation to impinge upon the detector near the periphery of the ion chamber to compensate for the inefficiency of the ion chamber near the outer walls.

Figure 7A:
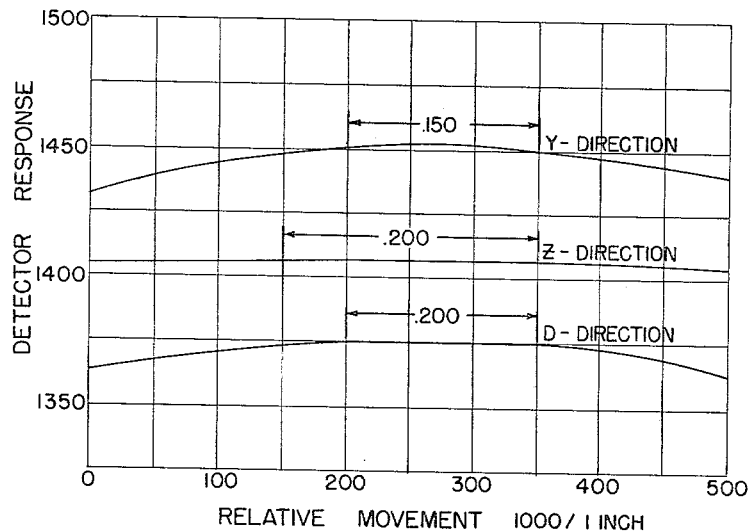
FIGS. 7a and 7b are graphical representations of detector response as a function of separation between detector and source for the embodiments of FIGS. 3 and 5, respectively.
Figure 7B:
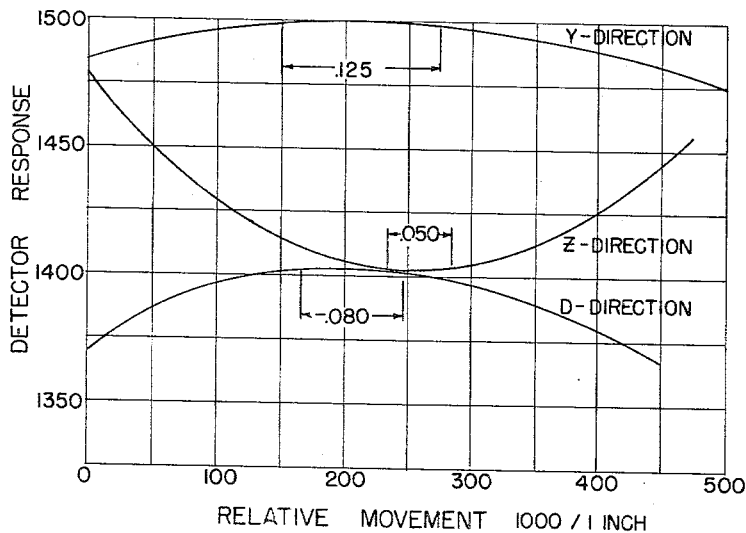

The detector response for the Sr–90 source-collimator system illustrated in FIGS. 3 and 4 is shown in FIG. 7a. As can be seen therein a plateau of at least .150 inch displacement in any direction is achieved. Similarly FIG. 7b indicates the detector response for the Kr–85 source collimator arrangement illustrated in FIGS. 5 and 6. The plateau in this arrangement is substantially .125 inch in any direction.

While the invention has been described above in terms of two relatively detailed embodiments, it is apparent that the invention is not so limited. For example, a specific number of radioactive sources and collimator holes has been cited in each embodiment, but obviously this number may be varied without affecting the operation of the system. In view of the fact that numerous modifications and departures may now be made by those skilled in the art, the invention herein is to be construed as limited only by the spirit and scope of the appended claims.

What is claimed is:

1. A radioactive thickness gauge sensor comprising, a radiation detector having a generally planar detection surface; first and second radioactive sources disposed in spaced apart relation on a plane vertically displaced from and parallel with said detection surface, each of said radioactive sources being formed of a material which emits beta radiation; collimating means adapted to form a defined beam of said beta radiation directed toward said detection surface and to confine said directed radiation to a predetermined area on said detection surface, said predetermined area having at least a portion of its periphery lying within the periphery of said detection surface; an absorber plate disposed adjacent to said detection surface and adapted to cover said surface, said absorber plate being formed of a material which absorbs substantially all of said beta radiation impingent upon it, said absorber plate having a substantially rectangular opening therein adapted to transmit said beta radiations to said detector surface, said rectangular opening being substantially centered at the center of said detection surface, said opening being such that said predetermined area overlaps the edges of said opening along one axis only of said rectangle.

2. A radiation thickness gauge sensor comprising, a radiation detector having a defined detection surface; first and second radiation sources disposed in spaced apart relation on a plane vertically displaced from said detection surface and parallel with said surface, each of said sources being formed of a material which emits beta radiation; first and second single hole collimators, said first collimator being disposed adjacent to said first radioactive source and said second collimator being disposed adjacent to said second radioactive source, each of said collimators forming a defined beam of beta radiations directed generally toward said detection surface, each of said beams having an angle of inclination with respect to the plane on which said radioactive sources are disposed such that said beams intersect intermediate said radioactive sources and said detection surface, each of said radiation beams forming a predetermined irradiated area at said detection surface having at least a portion of its periphery lying within the periphery of said detection surface, said irradiated areas being in overlapping relationship with one another; an absorber plate disposed intermediate said radioactive sources and said detector surface in substantial superposition over said detection surface, said absorber plate having an elongated opening therein with the longitudinal axis transverse the axis of alignment of said radioactive sources, said opening being disposed with respect to said predetermined irradiated area such that at least a portion of the longitudinal edges of said opening lie within said predetermined area and the short edges of said opening lie entirely without said predetermined area.

3. A radioactive thickness gauge sensor comprising, an ionization chamber having a circular bottom face serving as a detection surface; a radioactive source holder disposed with a predetermined spacing below said detection surface and having an upper surface parallel with said detection surface; first and second radioactive sources mounted within said source holder and disposed radially with respect to and equidistant from the center of said detection surface, each of said radioactive sources being formed of a material which emits beta radiation; shutter means included within said source holder and adapted to absorb the radiations from said radioactive sources in one position and to transmit the radiations from said radioactive sources in another position; a first single hole collimator adapted to form said beta radiations from said first radioactive source into a first relatively narrow beam directed toward said detection surface; a second single hole collimator adapted to form said beta radiations from said second radioactive source into a second relatively narrow beam directed toward said detection surface, each of said beams being such that the areas irradiated at said detection surface each have at least a portion of their peripheries lying within the periphery of said detection surface; an absorber plate covering said detection surface, said absorber plate being formed of a material adapted to absorb substantially all of the radiations inpingent upon it, said absorber plate having a generally rectangular elongated opening therein with the longitudinal axis of said opening extending transverse of the axis of alignment of said radioactive sources, said rectangular opening being substantially centered on the center of said circular detection surface; one of the longitudinal edges of said opening intersecting the area irradiated by said first radiation beam and the other of said longitudinal edges of said opening intersecting the area irradiated by said second radiation beam.

4. Apparatus in accordance with claim 3 wherein said generally rectangular elongated opening is widened near each end thereof.

5. A radioactive thickness gauge sensor comprising; a radiation detector having a generally planar detection surface, a source of beta radiations disposed on a plane vertically displaced from said detection surface; collimating means disposed with respect to said radioactive source in such a manner as to form a plurality of defined beams of beta radiation directed toward said detection surface and producing at said detection surface a plurality of irradiated areas, each having at least a portion of its periphery lying within the periphery of said detection surface; an absorber plate covering said detection surface and having a plurality of openings therein adapted to transmit beta radiation, said absorption plate being formed of material adapted to absorb substantially all of the beta radiation impingent upon it, said openings in said absorber plate being arranged with respect to said irradiated areas such that only a portion of each of said irradiated areas is superposed on said openings.

6. A radioactive thickness gauge sensor comprising, a radiation detector having a generally planar detection surface; a source of beta radiation vertically displaced from said detection surface; a collimator element disposed in close juxtaposition to said beta-ray source, said collimator element being adapted to form first and second divergent beams of beta radiation directed toward said detection surface, said first beam of beta radiation producing a first irradiated area on said detection surface, and said second radiation beam producing a second irradiated area on said detection surface, said first and said second irradiated areas each having at least a portion of their peripheries lying within the periphery of said detection surface; a masking plate placed over said detection surface, said masking plate being formed of material adapted to absorb substantially all of the beta radiation from said beta source impingent upon it, said masking plate having a first and second opening therein, said first opening lying within only a portion of said first irradiated area and said second opening lying within only a portion of said second irradiated area.

7. Apparatus in accordance with claim 6 wherein said radioactive source is formed of the material krypton 85.

References Cited by the Examiner
UNITED STATES PATENTS

| | | | |
|---|---|---|---|
| 2,735,018 | 2/56 | McLachlan | 250—105 X |
| 2,883,552 | 4/59 | Faulkner et al. | 250—83.3 |
| 2,884,536 | 4/59 | Swift | 250—83.3 X |
| 3,027,459 | 3/62 | Alcock et al. | 250—83.3 |

RALPH G. NILSON, *Primary Examiner.*